June 10, 1930.  L. COX  1,763,135
PIPE WRENCH
Filed Nov. 11, 1927   3 Sheets-Sheet 1

Inventor
Luther Cox,
By Clarence A. O'Brien
Attorney

June 10, 1930.   L. COX   1,763,135
PIPE WRENCH
Filed Nov. 11, 1927   3 Sheets-Sheet 2

Inventor
Luther Cox,
By Clarence A. O'Brien
Attorney

June 10, 1930.  L. COX  1,763,135
PIPE WRENCH
Filed Nov. 11, 1927  3 Sheets-Sheet 3

Inventor
Luther Cox,
By Clarence A. O'Brien
Attorney

Patented June 10, 1930

1,763,135

UNITED STATES PATENT OFFICE

LUTHER COX, OF SMACKOVER, ARKANSAS

PIPE WRENCH

Application filed November 11, 1927. Serial No. 232,626.

The present invention relates to pipe wrenches and has for its principal object to provide a tool of this character embodying a pipe gripping element arranged to be freely mounted on the pipe and a gripping element detachably connected thereto and arranged for engaging the pipe for movement therewith, said first named gripping element having an operating lever pivotally mounted thereon and provided with a pawl arranged for engagement with a set of ratchet teeth arranged on said last named gripping element whereby through the operation of the lever to cause the movement of each of said elements as a unit with the pipe.

A further object of the invention is to provide one of said pipe gripping elements with a plurality of gripping teeth adapted to form a positive engagement with the pipe so as to cause the rotation of the pipe and the gripping element as a unit and to provide means for reversing the gripping element upon the pipe so as to provide for the movement thereof in opposite direction.

A still further object is to provide a tool of this character of simple and practical construction, which is strong and durable, efficient and reliable in performance, relatively inexpensive to manufacture and otherwise well adapted for the purpose for which it is intended.

Figure 1:
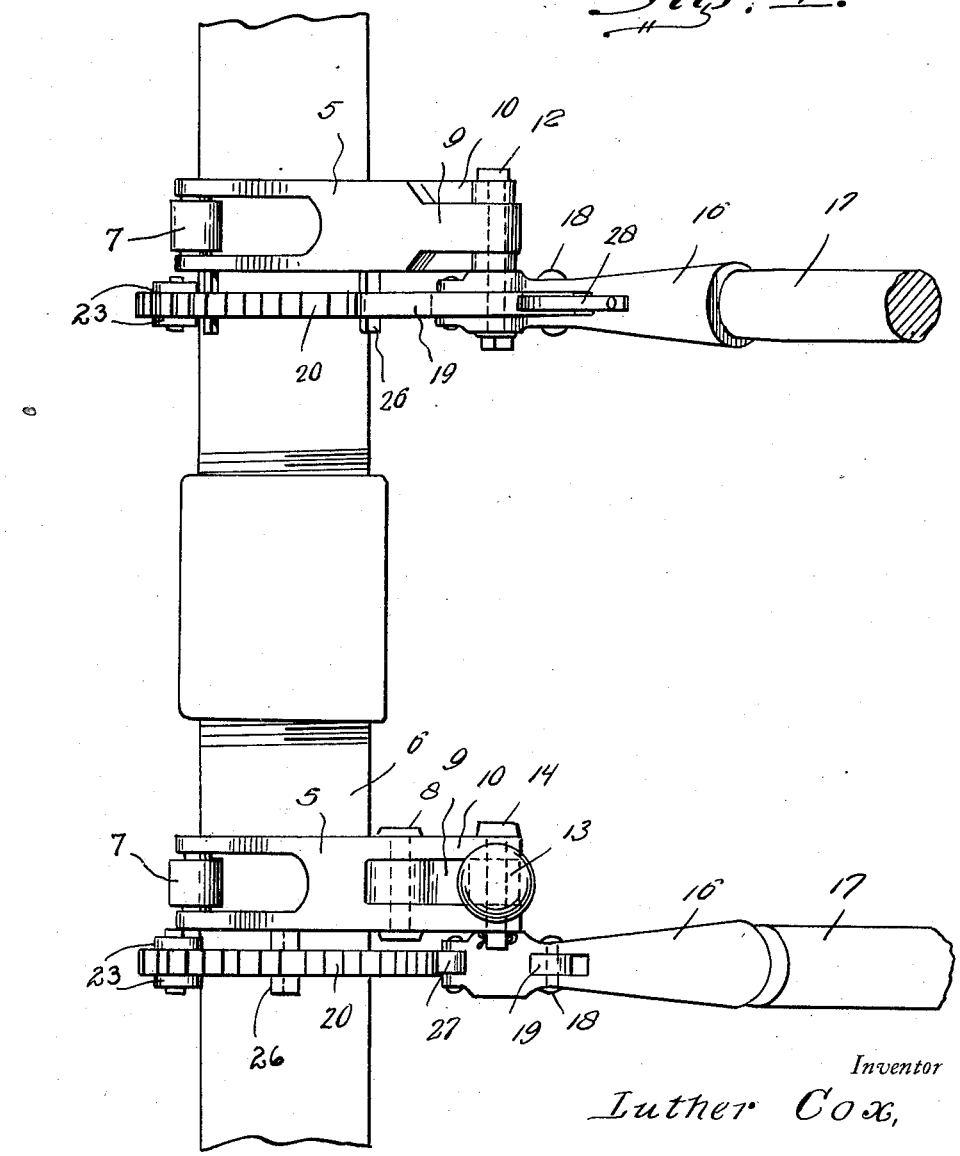
Figures 2, 3:
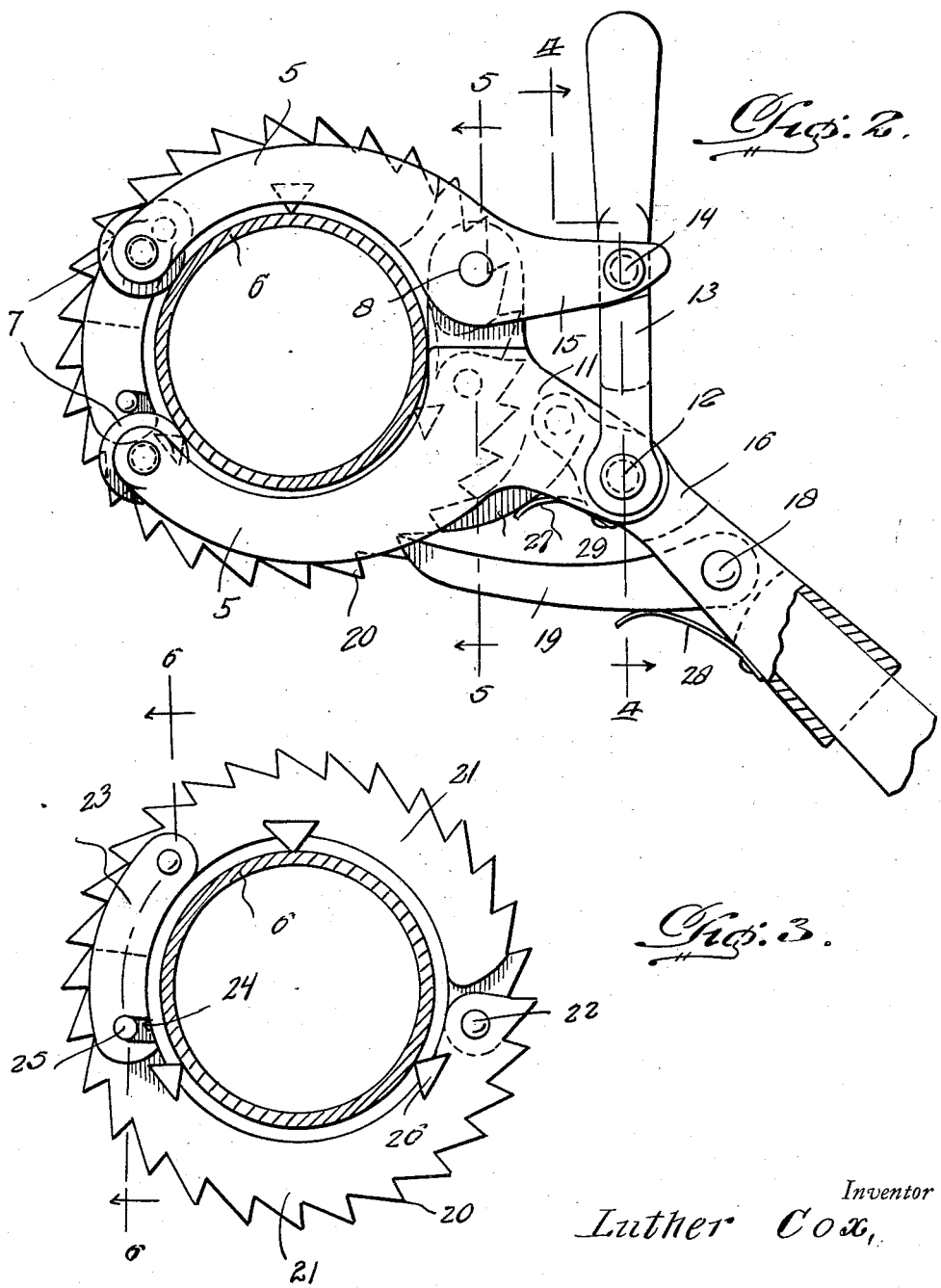
Figure 4:
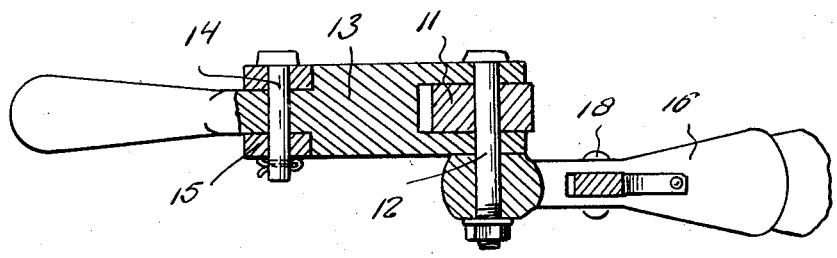
Figure 5:
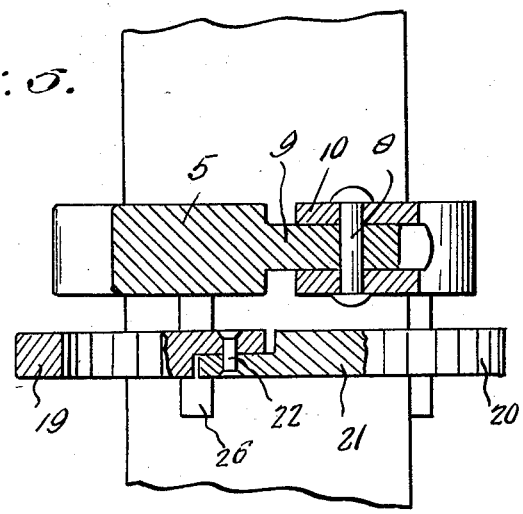
Figure 6:
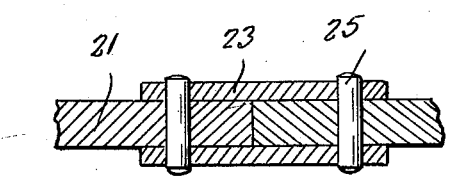

Other objects and advantages reside in the special construction and combination of the various elements comprising the invention, reference being had to the accompanying drawings forming a part hereof, wherein:

Figure 1 is a plan view of a pair of pipe sections, each provided with a pipe wrench constructed in accordance with my invention and shown in position for reversing the direction of movement of the pipe, Figure 2 is a transverse sectional view through the pipe section with the tool shown in operative position thereon, Figure 3 is a similar view showing the pipe gripping member in engaged position on the pipe, Figure 4 is a sectional view taken substantially along the line 4—4 of Figure 2, Figure 5 is a similar view along the line 5—5 of Figure 2, and Figure 6 is a sectional view taken along a line 6—6 of Figure 3.

Referring now to the drawings in detail, as shown my invention comprises a pair of arcuate pipe engaging segments 5 adapted to be freely mounted upon a pipe 6, one end of each of said segments having rollers 7 rotatably mounted thereon in engagement with the outer periphery of the pipe and the opposite ends of said segments being pivotally connected by a pin 8 extending through a tongue 9 extending from one of the segments and inserted in the yoked end 10 of the opposite segment.

The connected end of one of the segments is formed into a lateral extension 11 having a pivot pin 12 extending transversely therethrough and on which is pivotally mounted one end of a link 13 carrying a pin 14 thereon intermediate its ends and adapted to be introduced in an opening formed in an extension 15 provided on the connected end of the opposite segment 5. It will therefore be apparent that the segments 5 may be mounted upon the pipe for free movement with respect thereto by the engagement of the pin 14 carried on the link 13 with the opening arranged in the extension 15 of one of the segments.

One end of a handle socket member 16 is pivotally mounted on the pin 12, with its outer end adapted for receiving the handle 17, said socket member having a pivot pin 18 upon which is pivotally mounted one end of a pawl 19 with its free end engageable with the ratchet teeth 20 formed on a pair of pipe gripping segments 21.

The ratchet segments 21 are pivotally connected to each other at one end by a pivot pin 22, the connected ends of the segments being arranged in overlapping relation as illustrated in Figure 5 of the drawings, each of the overlapping ends having a portion of one of the teeth 20 formed thereon to prevent any break in the continuity thereof. At the ends of the segments opposite from their pivotal connection is arranged a latch member 23 pivotally mounted on one of the segments and extending in overlapping relation with respect to the adjacent end of the opposite segment, the free end of the latch being provided with a notch 24 adapted to receive a pin 25 formed on the opposite segment whereby to enable the same to be secured about the pipe 6.

The inner periphery of the ratchet segments are provided with a plurality of dovetailed recesses adapted to receive the base of triangular shaped pipe gripping elements 26, said elements having their gripping edges extending longitudinally with respect to the pipe. At the inner end of the handle socket 16 is pivotally mounted a pawl 27 extending in a direction similar with the pawl 19 and likewise engaging the teeth 20 of the ratchet segments. Both the pawls 19 and 27 are provided with leaf springs 28 and 29 respectively adapted to retain the free ends of the pawls in engaged relation with the ratchet teeth.

In the operation of the tool, the arcuate segments 5 are first mounted on the pipe section with the extensions 11 and 15 formed on the ends thereof secured to each other by means of the lever 13. The ratchet segments 21 are then arranged upon the pipe section in position for engagement by the pawls 19 and 27 and upon operation of the handle 17 in a proper direction it will be apparent that by reason of the gripping action of the element 26 carried on the inner periphery of the ratchet segments that the pipe will be firmly gripped and rotated together with the segments. When it is desired to rotate the pipe section in an opposite direction the relative position of the parts are reversed from the arrangement shown in the device at the upper portion of Figure 1 to that shown in the lower portion thereof.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

In a pipe wrench, a pair of arcuate pipe engaging segments freely mounted on the pipe and pivotally connected at one end, rearwardly diverging extensions formed on said connected ends, a link pivotally connected to one extension and adapted to be detachably connected to the other extension for releasably connecting said extensions for maintaining the segments in fixed relative position, a section annular pipe gripping member formed of a pair of arcuate sections pivotally connected at one end, latch means releasably connecting their opposite ends for retaining the same upon the pipe, gripping elements carried at the inner periphery of the sections thereof, ratchet teeth formed at the outer periphery thereof and a handle member pivotally attached to one of said extensions having pawls carried thereon and disposed at opposite sides of the pivotal connection of the handle and engaging said ratchet teeth for respectively operating the gripping member upon opposite movement of the handle.

In testimony whereof I affix my signature.

LUTHER COX.